United States Patent [19]

Kablaoui et al.

[11] 3,852,205

[45] Dec. 3, 1974

[54] TRANSMISSION FLUID COMPOSITIONS AND METHOD

[75] Inventors: Mahmound S. Kablaoui, Wappingers Falls; Arthur W. Godfrey, Fishkill; Robert E. Reid, Wappingers Falls, all of N.Y.

[73] Assignee: Texaco, Inc., New York, N.Y.

[22] Filed: Nov. 5, 1973

[21] Appl. No.: 413,100

[52] U.S. Cl. ............. 252/47.5, 252/77, 260/326 S, 260/534 E
[51] Int. Cl. ............................................. C10m 1/38
[58] Field of Search .......... 252/47.5, 77; 260/326 S, 260/534 E

[56] References Cited
UNITED STATES PATENTS

| | | | |
|---|---|---|---|
| 3,309,316 | 3/1967 | McNinoh et al. | 252/47.5 |
| 3,598,735 | 8/1971 | Wang | 252/47.5 |
| 3,687,852 | 8/1972 | Godfrey et al. | 252/51.5 A |

FOREIGN PATENTS OR APPLICATIONS

| | | | |
|---|---|---|---|
| 600,368 | 6/1960 | Great Britain | 252/47.5 |

*Primary Examiner*—W. Cannon
*Attorney, Agent, or Firm*—Thomas H. Whaley; C. G. Ries

[57] ABSTRACT

A lubricating oil composition and concentrates thereof comprising a major proportion of mineral lubricating oil and a friction modifying amount of a member selected from the group consisting of S-carboxyalkylene hydrocarbylsuccinimide, S-carboxyalkylene hydrocarbyl succinamic acid and mixtures thereof and a method of operating automatic transmissions having friction sensitive power transmitting means utilizing a composition comprising a mineral oil and said member.

12 Claims, No Drawings

TRANSMISSION FLUID COMPOSITIONS AND METHOD

BACKGROUND OF INVENTION

The demands for improved performance and extended life for lubricating oil compositions, hydraulic fluids and automatic transmission fluids spur a continuing search for new additives and lubricating oil formulations to achieve the desired goals. Particular difficulty is being experienced in meeting the present day requirements for the fluid compositions utilized in central hydraulic systems and automatic transmissions. An automatic transmission is a complex hydraulic mechanism having friction sensitive power transmitting means which incorporates the function of a torque converter, wet clutches and planetary gearing in a relatively compact sealed unit. The lubricant for the automatic transmission must provide lubricity, extreme pressure and dispersant properties as well as satisfactory frictional properties. In addition, the fluid must not be corrosive to copper alloys or any way deleterious to the synthetic seals in the transmission. The most important requirement is the maintenance of good lubricity and friction modifying properties under prolonged, high shear and high temperature conditions.

Carboxylic acids or their derivatives are widely employed as lubricity agents or friction modifiers in mineral oil based automatic transmission fluids. These lubricity agents provide commerical automatic transmission fluids having a useful life. However, there is a continuing search for automatic transmission fluids of ever extended service life, that is, stability. Breakdown in stability of the automatic transmission fluid is indicated by a rising coefficient of friction in the fluid and by the early onset of erratic or harsh shifting in service. A substantial burden for the prevention or retardation of a rising coefficient of friction and the ability to provide smooth shifting over long periods of time falls to a great extent on the friction modifying component in the transmission fluid.

One of the automatic transmission fluids of the prior art of improved stability and shift performance is that described in U.S. Pat. No. 3,687,852 which contain substituted aspartimides represented by the formula:

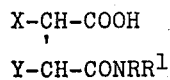

in which X and Y alternatively represent hydrogen and the radical $R^1R^2N-$ and where R and $R^1$ each represent an aliphatic hydrocarbon radical having from about 1 to 30 carbon atoms and $R^2$ is hydrogen or an aliphatic hydrocarbon radical having from 1 to 30 carbon atoms.

SUMMARY OF INVENTION

We have discovered and this constitutes our invention a novel automatic transmission fluid and concentrates thereof of improved stability and shift properties comprising at least about 50 wt. percent of a mineral lubricating oil and between about 0.01 and 50 wt. percent of a friction modifier selected from the group consisting of a S-carboxyalkylene hydrocarbylsuccinimide characterized by the formula:

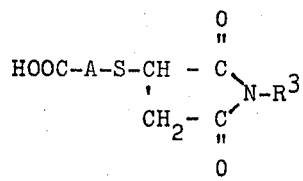

, S-carboxyalkylene hydrocarbylsuccinamic acid characterized by the formula:

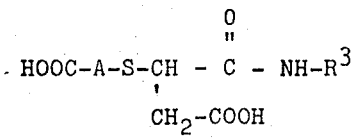

and mixtures thereof where $R^3$ is alkyl or alkenyl of from 8 to 30 carbons and A is a divalent saturated aliphatic hydrocarbon radical of from 1 to 16 carbons.

The novel method of the invention involves operating an automatic transmission having friction sensitive power transmitting means by supplying to the mechanism the above described transmission fluid.

DETAILED DESCRIPTION OF THE INVENTION

The friction modifiers of the invention are prepared in a two stage process comprising contacting maleic anhydride with a primary amine characterized by the formula $R^3NH_2$ where $R^3$ is alkyl or alkenyl of from $C_8$ to $C_{10}$ carbons at a temperature of between about 80° and 200°C., preferably in the presence of an inert diluent such as toluene, benzene, mixed xylenes, heptane and isooctane utilizing a mole ratio of anhydride to amine of about 1:1. The reaction is conducted in the first stage normally for a period of between about 1 and 10 hours. During the first stage water byproduct may be totally or partially removed via azeotroping, the degree of water removal determining whether the final product is in the amic form, the amide form or a mixture of amic and imide forms. No water removal favors a 100 percent amic acid, complete theoretical water removal favors a 100 percent imide and an incomplete water removal favors a mixture of amic and imide product. Irrespective of the degree of water removal, the resultant intermediate reaction product is contacted with a thiocarboxylic acid characterized by the formula:

HS-A-COOH where A is characterized by the formula

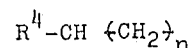

where $n$ is an integer of from 0 to 5 and $R^4$ is hydrogen or alkyl of from 1 to 10 carbons at a temperature between about 50° and 150°C. utilizing a mole ratio of thiocarboxylic acid to maleic anhydride of 1:1. The reaction period is normally for a period of between about ½ and 3 hours. In order to render the reaction mixture fluid, an inert solvent (such as benzene, isooctane, toluene, xylene or heptane) may be employed.

The first stage of the reaction under preferred conditions is conducted in an inert gas atmosphere such as nitrogen. The second stage of the reaction under preferred conditions need not be conducted in an inert atmosphere. The final reaction mixture is cooled, filtered and solvent stripped, normally at reduced pressure. The residual product is the desired succinimide, succinamic acid or mixtures thereof.

Examples of the amine reactants contemplated herein are $C_{14}-C_{20}$ secondary alkyl primary amine mixtures, $C_{12}$–$C_{20}$ n-alkyl primary amine mixtures, $C_{12}$–$C_{20}$ n-alkenyl primary amine mixtures, oleyl primary amine, $C_{12}$–$C_{20}$ secondary alkenyl primary amine mixtures and tallow primary amine.

Examples of the thiocarboxylic acids contemplated herein are mercaptoacetic acid, 1-mercaptopropanoic acid, 1-mercaptobutanoic acid, 1-mercaptodecanoic acid, and 4-mercapto-5-methyl decanoic acid.

Examples of the friction modifying succinimide, succinamic acid or the succinimide-succinamic acid mixture friction modifiers characterized by the formulas:

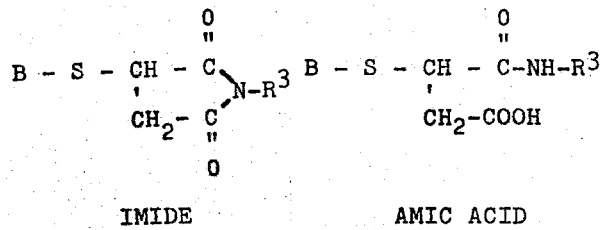

IMIDE                AMIC ACID where R is a $C_{14}$–$C_{20}$ secondary alkyl, and B is HOOC-$CH_2$—; $R^3$ is oleyl and B is HOOC-$CH_2$—; $R^3$ is $C_{18}$ alkyl and B is HOOC-$CH_2$—; $R^3$ is dodecenyl and B is

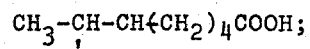

$R^3$ is decyl and B is

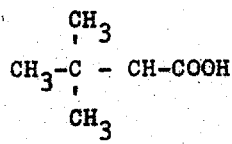

It is to be noted that in the succinimide-succinamic acid mixtures the amic acid and the imide components are the corresponding amic acid and imide versions of one another.

Upon manufacture of the friction modifier component the concentrate form of the contemplated composition is normally prepared in the interests of economy in storage and transportation. The concentrate manufacture is accomplished by combining the contemplated friction modifier with a limited amount of the mineral oil component and any additional additives to form a concentrate composition of at least about 50 wt. percent mineral oil and at least about 5 wt. percent friction modifier. The finished compositions are formed by dilution of the concentrate with additional mineral oil component to form a finished composition of at least 85 wt. percent mineral oil and between about 0.01 and 5 wt. percent friction modifier.

The finished automatic transmission fluid of the invention will generally be a formulated fluid containing minor amounts of the conventional additives. For example, the automatic transmission fluid can contain in addition to the contemplated friction modifiers between about 0.5 and 5 wt. percent of an ashless dispersant such as the succinimide reaction product of a polyalkylene polyamine and $C_{50}^+$ alkenyl succinic anhydride, between about 0.5 to 8 wt. percent of mixed alkyl esters of methacrylic acid having molecular weights above 25,000 as VI improvers; between about 0.1 to 5 wt. percent of a zinc dialkyl dithiophosphate or ashless wear inhibitor; alkyl or aryl substituted phenyl or naphthyl amine or corrosion inhibitors; 0.01 to 5 wt. percent of a bis alkyl dithiothiadithiazole; and between about 0.1 and 5 wt. percent alkali metal alkyl or alkaryl sulfonate as demulsifier.

The automatic transmission fluid of the invention is generally characterized by an SUS viscosity at 210°F. of between about 49 to 60, a viscosity index of at least about 150 and pour point below −40°F. and meets the essential Dexron specifications set by General Motors for automatic transmission fluids.

The mineral lubricating oil base which constitutes at least 85 wt. percent of the finished composition and at least about 50 wt. percent of the concentrate of the finished composition, is a refined oil or a mixture of refined oils selected according to the viscosity requirements of the particular service. For automatic transmissions where the requirements include an SUS viscosity of the compound oil at 210°F. of 49 minimum up to 60 and at 0°F. of 7,000 maximum (extrapolated) the base oil or the major component thereof is generally a distilled oil lighter than an SAE 10 Motor Oil, such as one having an SUS viscosity at 100°F. less than 150 and generally between 50 and 125. Typically, the distillate fraction can be paraffinic distillate or a combination of paraffinic and naphthenic distillate. The flash point of the distillate component of the base oil will generally be substantially above 300°F., if the distillate fraction constitutes the entire base oil, its flash point will usually be above 350°F.

A particularly preferred base oil comprises approximately 70 to 95 wt. percent of a refined paraffinic distillate oil and 5 to 30 wt. percent of a refined naphthenic distillate oil. An effective base oil mixture comprises 78 wt. percent of a furfural refined, acid treated, clay contacted, solvent dewaxed paraffin base distillate having an SUS viscosity at 100°F. of 100, a viscosity index of about 100, a flash above 385°F. and a pour point about +10°F., and 22 wt. percent of an acid treated naphthenic base distillate having an SUS at 100°F. of 60, a flash above 300°F., a pour point below 40°F.

Viscosity index improvement of the formulated finished automatic transmission fluid of the invention is normally effected with a methacrylate ester polymer having the formula:

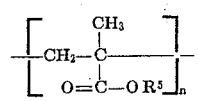

where $R^5$ is an alkyl group, a dialkylaminoalkyl group, a mixture of such groups containing from 1 to 20 carbons and n is an integer providing a molecular weight of the polymer in the range of 25,000 to 1,250,000 and preferably 35,000 to 200,000. Methacrylate ester polymers possessing depressant and viscosity index improving properties are well known, e.g., U.S. Pat. No. 2,737,496. Very effective material of this type is a copolymer of the lower $C_4$ to $C_{14}$ alkyl methacrylate esters and the higher $C_{15}$ to $C_{20}$ alkyl methacrylate esters. A commerical methacrylate copolymer of this type which is primarily a viscosity index improver corresponds to the formula in which $R^5$ represents about 32 wt. percent lauryl, 28 wt. percent butyl and 26 wt. percent stearyl and 14 wt. percent hexyl. The methacrylate ester copolymer is employed in the base oil ranging from 0.5 to 10 wt. percent, preferably between about 1 and 5 wt. percent based upon the oil composition, in order to impart the desired viscosity index and pour point. It is to be understood that other types of VI improvers are employed.

As heretofore stated, a dispersant, preferably an ashless dispersant is generally present in the finished automatic transmission fluid. One such effective dispersant is the alkenyl succinimides characterized by the formula:

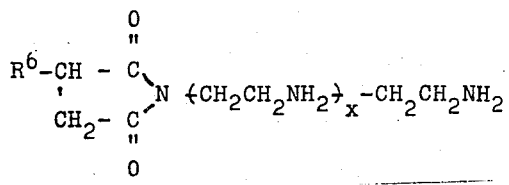

where $R^6$ is a large substantially monoolefinic aliphatic hydrocarbon radical of from 50 to 200 carbons and $x$ is an integer of from 1 to 10 of a polyethylene polyamine. Particularly suitable derivatives are the diethylene triamine, triethylene tetramine, tetraethylene pentamine of polyisobutylene succinic anhydride, particularly where $R^6$ is between about 700 and 2000, e.g., about 1300 molecular weight. These ashless dispersants are further described in U.S. Pat. No. 3,072,892 and 3,202,678.

Antioxidants are usually found in the fully formulated automatic transmission fluids. Effective antioxidants are the aryl substituted amine antioxidants exemplified by phenyl naphthyl amines, see U.S. Pat. No. 3,414,618, as well as compounds as phenylene diamine, phenothiazine, diphenyl amine. Particularly preferred antioxidants are phenyl-alphanaphthylamine and mixtures of alkylated diarylamines. These antioxidants further function as corrosion inhibitors in the finished transmission fluid. Other suitable antioxidants which also function as an antiwear agent are the bis alkyl dithiothiadiazoles. Suitable amounts in the finished composition are between about 0.1 and 5 wt. percent.

Other valuable components contemplated in the finished compositions are the hydrocarbyl dithiophosphates which function principally as corrosion inhibitors. Particularly effective compounds in this class are the zinc di-(nonylphenoxyethyl)-dithiophosphate, zinc di(dodeceylphenoxyethyl) dithiophosphate and zinc di(nonylphenyl)dithiophosphate. Zinc di(nonylphenoxyethyl) dithiophosphate is prepared by reacting nonylphenol-ethylene oxide compound with phosphorus pentasulfide followed by neutralization of the acid formed with a basic zinc compound, such as zinc carbonate, zinc oxide or zinc hydroxide. The general preparation and description of the compounds in this class is disclosed in U.S. Pat. Nos. 2,344,395 and 3,293,181. In use it is convenient to prepare a mineral oil solution of the zinc di($C_6$–$C_{15}$ alkylphenoxypolyoxyalkyl) dithiophosphate containing from between about 50 to 75 wt. percent of the zinc salt. These salts are not only function as corrosion inhibitors but act as oxidation inhibitors as well, particularly when employed in concentrations of between about 0.1 and 5 wt. percent of the automatic transmission fluid composition.

Antifoaming agents are conventionally employed in the automatic transmission fluids because the fluids are rapidly circulated in operation and air can be entrapped. For this purpose, a silicone fluid of high viscosity such as dimethyl silicone polymer having a kinematic viscosity at 25°C. of about 1000 centistokes and above is preferably employed. A very satisfactory antifoam agent for this purpose is prepared by diluting 10 grams of dimethyl silicone polymer (1,000 centistokes at 25°C.) with kerosene to provide a solution of 100 ccs. From about 0.005 to 0.025 percent by weight of this concentrate is generally employed in the hydraulic fluid to provide from about 50 to 200 ppm of the silicone polymer based on the transmission fluid composition.

The following examples further illustrate the invention but are not to be construed as limitations thereof.

EXAMPLE I

This example illustrates the preparation of the succinimide and succinamic friction modifying components contemplated herein.

To 196 grams (2 moles) of maleic anhydride and 500 mls. of toluene there was added 480 grams (2 moles) of a $C_{14}$–$C_{20}$ secondary alkyl primary amine mixture. It is to be noted that the $C_{14}$–$C_{20}$ denotes a mixture of alkyl groups ranging from 14 to 20 carbon atoms. The mixture was then heated to a reflux under nitrogen while azeotroping water out. After 4 hours of reflux, 19 mls. of water were azeotroped and the reaction mixture was cooled to room temperature. The nitrogen was discontinued and mercaptoacetic acid in an amount of 184 grams (2 moles) was added. The reaction mixture was heated to 80°C. for a period of 1.5 hours. The resultant solution was then cooled, filtered and solvent stripped (50 mm Hg., 100°C.). The product thus obtained was identified by infrared, nuclear magnetic resonance, Total Acid No. and elemental analysis as a 2:1 weight mixture of S-carboxymethylene-tallow succinimide/amic acid characterized by the formulas:

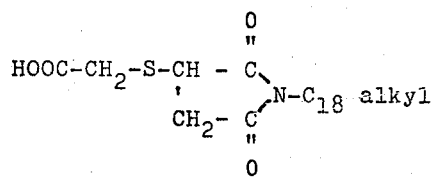

IMIDE

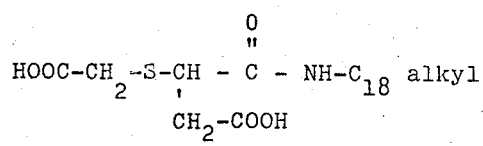

AMIC

The Total Acid No., sulfur and nitrogen analysis for the product is shown below:

| Description | Observed | Calculated |
|---|---|---|
| TAN | 174 | 130 for 100% imide |
|  |  | 260 for 100% amic |
| Wt. % S | 7.1 | 7.7 |
| Wt. % N | 3.0 | 3.4 |

EXAMPLE II

This example further illustrates the preparation of the succinamic acid and succinimide friction modifiers contemplated herein.

The procedure of Example I was repeated with the exception that a $C_{14}$–$C_{20}$ secondary alkyl primary amine mixture in an amount of 2 moles was substituted for the tallow amine of Example I. It is to be noted that $C_{14}$–$C_{20}$ secondary alkyl denotes a mixture of secondary alkyls ranging from 14 to 20 carbon atoms. The product on analysis was found to have a Total Acid No. of 168 and it was found to be S-carboxymethylene-$C_{14}$–$C_{20}$ secondary alkyl succinimide/amic acid mixture having an imide to amic weight ratio of 2:1 characterized by the formulas:

further demonstrates their superiority in respect to stability.

A lubricating oil composition of the invention, A, and comparative Compositions B and C were tested in standard industry test for automatic transmission fluids. The friction stable life of the transmission fluids was determined in a low energy cycling test known as the Dexron T-12 Test.

The Dexron T-12 Test, with minor variations, is described in the General Motors Dexron Automatic Transmission Fluid Specification issued April 1967. This test is conducted using Chevrolet engine with its corresponding Powerglide transmission mounted on a test stand in such a manner that the power output is absorbed by a Dynamatic 1519 eddy current dynamometer and an auxiliary inert wheel increasing total system inertia to 6.7 slug ft.$^2$. This system gives acceleration rates approximating vehicle level road values. The automatic transmission fluid is maintained at a temperature of about 275°F. The fluid must have a test life of 225 hours to pass. Test life of 400 or more hours represents premium friction modififying properties.

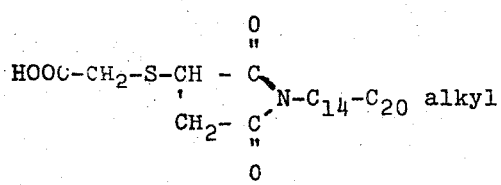

IMIDE

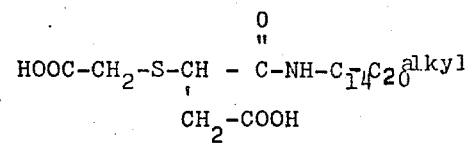

AMIC

EXAMPLE III

This example further illustrates the preparation of the succinamic acid and succinimide friction modifiers contemplated herein.

The procedure of Example I was repeated with the exception that 2 moles of oleyl amine was substituted for tallow amine. The final product was analyzed, found to have a Total Acid No. of 176 and determined to be S-carboxymethylene oleyl succinimide/amic acid mixture wherein the imide to amic mole ratio is 2:1 characterized by the formulas:

The fluid under test is used to fill the Powerglide transmission and it is tested by running the engine and transmission in a continuous series of 90 second cycles each consisting of four phases as follows: acceleration for 13.8 seconds open throttle power with upshift occurring at approximately 12–13 seconds after start, deceleration for 8.3 seconds power off (closed throttle) coast down in the top gear (no downshift), acceleration for 9.0 seconds power on (immediate forced kickdown to low), followed by an upshift approximately 9 seconds after start, and deceleration for 58.3 seconds power off. This test is conducted until shift failure (ex-

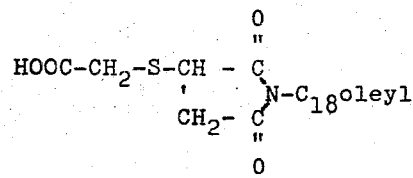

IMIDE

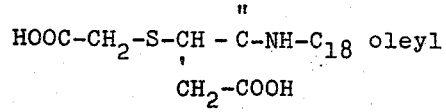

AMIC

EXAMPLE IV

This example illustrates the finished automatic transmission fluid compositions contemplated herein and cessive clutch slippage, upshift time over 0.90 seconds or abnormal shift).

The test data and results are compiled in Table I on the following page:

TABLE I

TRANSMISSION FLUID COMPOSITION AND TESTING

| Composition | A | B | C |
|---|---|---|---|
| Mineral Oil (100 SUS at 100°F.) | 90.7 | 91.4 | 90.7 |
| Diethyl-t-(mono & di) octyl diphenylamine | 0.6 | 0.6 | 0.6 |
| Zinc Dialkylphenyldithiophosphate | 0.8 | 0.8 | 0.8 |
| Polyisobutylene (122 m.w.) succinimide of tetraethylene pentamine | 1.0 | 1.0 | 1.0 |
| Tetrapolymer of butyl, lauryl, stearyl and dimethylaminoethyl methacrylate | 6.0 | 6.0 | 6.0 |
| Sodium Sulfonate | 0.5 | — | 0.5 |
| Bisoctyldithiothiadiazole | 0.2 | — | 0.2 |
| Silicone Antifoam | ← | 150 PPM | → |
| Red Dye | ← | 128 PPM | → |
| Friction Modifier (active) | | | |
|   Ex. 1 Prod.[1] | 0.2 | — | — |
|   Aspartamide[2] | — | 0.2 | — |
|   N-oleyl sarcosine | — | — | 0.2 |
| Test | | | |
| Dexron T-12, Hrs to Fail | 427 | 352 | 293 |

[1] S-carboxymethylene-n-tallow succinimide/amic of Ex. 1.
[2] N,N'di-$c_{15}$-$C_{20}$ sec. alkyl aspartic acid monoamide.

As can be seen from the above table, representative Composition A utilizing 0.2 wt. % S-carboxy succinimide/amic acid friction modifier was substantially superior to the well known N-oleyl sarcosine and dialkyl aspartic acid monoamide friction modifier containing compositions.

We claim:

1. A mineral oil composition comprising at least about 50 wt. percent of a mineral lubricating oil and between about 0.01 and 50 wt. percent of a friction modifier selected from the group consisting of S-carboxylalkylene hydrocarbylsuccinimide characterized by the formula:

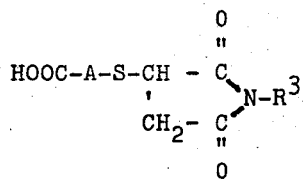

, S-carboxyalkylene hydrocarbylsuccinamic acid characterized by the formula:

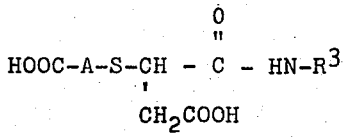

and mixtures thereof where $R^3$ is alkyl or alkenyl of from 8 to 30 carbon atoms and A is a divalent saturated aliphatic hydrocarbon of from 1 to 16 carbons.

2. A mineral oil composition in accordance with claim 1 wherein said lubricating oil is present in an amount at least about 50 wt. percent and said friction modifier is present in an amount between about 5 and 50 wt. percent.

3. A mineral oil composition useful in automatic transmission service comprising at least about 85 wt. percent of a mineral lubricating oil and between about 0.01 and 5 wt. percent of a friction modifier selected from the group consisting of S-carboxyalkylene hydrocarbyl succinimide characterized by the formula:

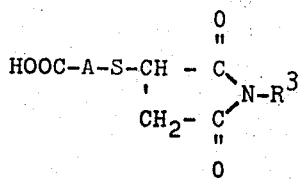

, S-carboxyalkylene hydrocarbylsuccinamic acid characterized by the formula:

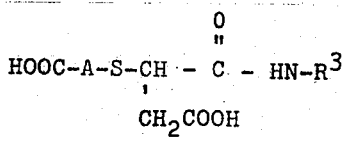

and mixtures thereof where $R^3$ is alkyl or alkenyl of from 8 to 30 carbons and A is a divalent saturated aliphatic hydrocarbon of from one to 16 carbons.

4. A lubricating oil composition in accordance with claim 3 wherein said friction modifier is said mixture and where A is methylene and $R^3$ is $C_{18}$ alkyl.

5. A lubricating oil composition in accordance with claim 3 wherein said friction modifier is said mixture and where A is methylene and $R^3$ is $C_{14}$–$C_{20}$ secondary alkyl.

6. A lubricating oil composition in accordance with claim 3 wherein said friction modifier is said mixture and where A is methylene and $R^3$ is oleyl.

7. A lubricating oil composition in accordance with claim 3 where said friction modifier is said mixture and the weight ratio of imide to amic acid is about 2:1.

8. A method for operating an automatic transmission which comprises supplying to said transmission a lubricating oil composition comprising at least about 85 wt. percent of a mineral lubricating oil and between about 0.01 and 5 wt. percent of a friction modifier selected from the group consisting of S-carboxyalkylene hydrocarbylsuccinimide characterized by the formula:

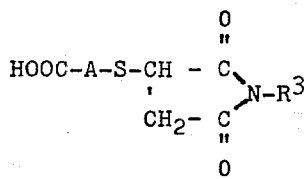

, S-carboxyalkylene hydrocarbyl succinamic acid characterized by the formula:

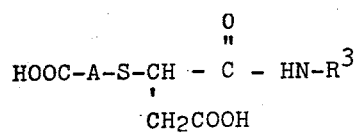

and mixtures thereof where $R^3$ is alkyl or alkenyl of from 8 to 30 carbons and A is a divalent saturated aliphatic hydrocarbon of from one to 16 carbons.

9. A method for operating an automatic transmission which comprises supplying to said transmission a lubricating composition in accordance with claim 8 wherein said friction modifier is said mixture and where A is methylene and $R^3$ is $C_{18}$ alkyl.

10. A method for operating an automatic transmission which comprises supplying to said transmission a lubricating composition in accordance with claim 8 wherein said friction modifier is said mixture and where A is methylene and $R^3$ is $C_{14}$–$C_{20}$ secondary alkyl.

11. A method of operating an automatic transmission which comprises supplying to said transmission a lubricating composition in accordance with claim 8 wherein said friction modifier is said mixture and where A is methylene and $R^3$ is oleyl.

12. A method of operating an automatic transmission which comprises supplying to said transmission a lubricating composition in accordance with claim 8 wherein said friction modifier is said mixture and the weight ratio of imide to amic acid is about 2:1.

* * * * *